US009123197B1

(12) United States Patent
Mayeroff et al.

(10) Patent No.: US 9,123,197 B1

(45) Date of Patent: Sep. 1, 2015

(54) GAMING SYSTEM AND METHOD OF OPERATION

(75) Inventors: Jason Mayeroff, Bangkok (TH); Peter S. Lyons, Seattle, WA (US)

(73) Assignee: KONAMI GAMING, INC., Las Vegas, NV (US)

( * ) Notice: Subject to any disclaimer, the term of this patent is extended or adjusted under 35 U.S.C. 154(b) by 825 days.

(21) Appl. No.: 11/804,432

(22) Filed: May 18, 2007

(51) Int. Cl.
*G06F 17/00* (2006.01)
*G07F 17/32* (2006.01)

(52) U.S. Cl.
CPC ............ *G07F 17/32* (2013.01); *G07F 17/3244* (2013.01)

(58) Field of Classification Search
USPC ........................................................ 463/16–25
See application file for complete search history.

(56) References Cited

U.S. PATENT DOCUMENTS

| | | | | |
|---|---|---|---|---|
| 7,056,205 | B2 * | 6/2006 | Odom et al. | 463/13 |
| 2002/0103017 | A1 * | 8/2002 | Odom et al. | 463/13 |
| 2002/0155872 | A1 * | 10/2002 | Odom et al. | 463/13 |
| 2003/0013516 | A1 | 1/2003 | Walker et al. | |
| 2003/0186739 | A1 * | 10/2003 | Paulsen et al. | 463/25 |
| 2005/0153768 | A1 * | 7/2005 | Paulsen | 463/16 |
| 2005/0282626 | A1 * | 12/2005 | Manfredi et al. | 463/25 |
| 2006/0121976 | A1 * | 6/2006 | Odom | 463/19 |
| 2010/0056264 | A1 * | 3/2010 | Jordan et al. | 463/25 |

* cited by examiner

*Primary Examiner* — Ronald Laneau
(74) *Attorney, Agent, or Firm* — Howard & Howard Attorneys PLLC

(57) ABSTRACT

A system for conducting gaming includes at least one gaming machine communicating with an award server. Optionally, the gaming machine communicates with the award server via a network server. A game is conducted at the gaming machine. A determination is made whether to issue an award from the award server. In an optional embodiment, the determination is random; in another optional embodiment, the determination is based on the outcome of the game. The award is issued from the award server, at least in part, based on data communicated between the gaming machine and the award server.

39 Claims, 5 Drawing Sheets

GAMING SYSTEM AND METHOD OF OPERATION

FIELD OF THE INVENTION

The present invention relates to gaming systems. More particularly, the present invention relates to a system and method of operating a system, in which an award is issued for play on a gaming machine by a remote award server based on data communicated between the gaming machine and the award server.

BACKGROUND OF THE INVENTION

Gaming machines take many forms, such as video gaming machines which conduct video reel slot machine games or video card games, mechanical slot machines, electronic table games, or the like. However, all these gaming machines issue awards similarly. That is, the awards are issued to the player in currency or a form representing currency.

For example, in a typical gaming machine, currency is deposited into the gaming machine via a bill acceptor, or a voucher representing currency is deposited into the gaming machine via a ticket receiver. The amount deposited is tracked as gaming credits in a credit register in the gaming machine. The game is conducted, with wagers deducted from the credit register and winnings added to the credit register. Upon completing a play session, the player depresses a "cash out" button and the balance in the credit register is provided to the player in the form of cash, coin, or, more commonly, a voucher.

A drawback of cash, coin, or vouchers is the possibility of physical loss of the cash, coin, or voucher. For example, vouchers are not tracked in any way that allows a casino to replace a lost, damaged, or destroyed voucher. As may be appreciated, the physical loss of a voucher representing a large sum of money may be very disconcerting for a player.

For the part of the casino, cash, coin, and vouchers can represent a lost opportunity to get the player to spend the money represented. That is, once the player has "cashed out," the money is very real to the player and he or she may be less likely to participate in further gaming activities.

Additionally, monetary awards have a fixed value to the casino. It is known, for example, that offering prizes in-kind allows the casino to offer a prize that has a greater value to the player than the cost to the casino. For example, Walker, U.S. Patent Application Publication No. US 2003/0013516, discloses a method and apparatus for offering and providing consolation, in-kind prizes based on the player's losses and the player's history of play gleaned from player tracking data.

It can be seen that there is a need in the art for a system and method in which an award is issued for play on a gaming machine by a remote award server based on data communicated between the gaming machine and the award server.

SUMMARY OF THE INVENTION

A gaming system is adapted to transmit data to, and receive data from, a remote award server. In an optional embodiment, the award server may be an Internet web server in communication with a world wide web of web servers. In another optional embodiment, the award server is an intranet server serving a network formed from the network servers described in greater detail below.

The gaming system includes at least one gaming machine. The gaming machine or gaming machines conducts a game of chance according to a predefined set of game rules for at least one player. The gaming machine includes a data processor including a random number generator. The random number generator generates a random number used, at least in part, to generate an outcome for the game. The data processor determines the issuance of an award. The issuance of an award may be determined randomly or in response to at least one of the outcomes. The gaming machine also includes a gaming machine communication device in communication with the data processor. In an optional embodiment, the gaming device includes an input device in communication with the data processor.

The gaming system includes an award server communicating with the gaming machine. In an optional embodiment, the award server may communicate directly with the gaming machine such that the award server issues the award, at least in part, by receiving data from, and transmitting data to, the gaming machine. In an optional embodiment, the award issued by the award server is separate from, and in addition to, a pay out issued at the gaming machine.

In an optional embodiment, data received at the award server may include player data, outcome data, wager data, input from the player at the gaming machine, or other forms of data. Optionally, the award issued depends, at least in part, on the data.

In another optional embodiment, the award server may communicate with the gaming machine via a network server. In such an optional embodiment, the network server has a network server communication device communicating with the gaming machine through the gaming machine communication device. The network server communication device also communicates with the award server such that the award server issues the award, at least in part, by receiving data from, and transmitting data to, the gaming machine via the network server.

In an optional embodiment in which the gaming machine includes an input device, the award server may issue at least the award, at least in part, in response to input received at the data processor via the input device and transmitted to the award server directly or via the network server.

In an optional embodiment, a gaming system may include a database storage device in communication with a network server. In one such optional embodiment, player records, such as player tracking records, stored at the database storage device are accessible to the network server.

The present invention also includes a method for operating a gaming system adapted to transmit data to, and receive data from, a remote award server. The method includes providing at least one gaming machine conducting a game of chance. As previously described, the gaming machine may include a data processor including a random number generator and a gaming machine communication device in communication with the data processor. Optionally, the gaming machine also includes an input device in communication with the data processor.

An award server in communication with the gaming machine is provided. Optionally, the award server communicates with the gaming machine via a network server. The network server includes a network server communication device to communicate with the gaming machine through the gaming machine communication device. The network server communication device also communicates with the award server.

The game is conducted at a gaming machine for at least one player. The game is conducted according to a predefined set of game rules to obtain an outcome that is determined, at least in part, by a random number generated by the random number generator. In an optional embodiment, the award server determines the award randomly or based on data received from the gaming machine; in another optional embodiment, the award server is limited to a predetermined award. The award server issues the award, at least in part, by receiving data from, and transmitting data to, the gaming machine either directly or via a network server. The award server may issue the award in response to a random determination by the gaming machine or may issue the award in response to at least one of the outcomes. In an optional embodiment in which the gaming machine includes an input device, the method may also include receiving input at the data processor via the input device, transmitting data to the award server representing the input received, and issuing at least the award, at least in part, in response to input received at the data processor via the input device and transmitted to the award server directly or via the network server.

Optionally, the method may include storing player records, such as player tracking records, at a database storage device in communication with the network server. In one such optional embodiment, the player records stored at the database storage device are accessed by the network server.

In an optional embodiment, the award server is an Internet web server in communication with a world wide web of web servers. In one such optional embodiment, the award server issues the award by transmitting packets of data to, and receiving packets of data from, the gaming machine via the world wide web. In another optional embodiment, the award server is an intranet server serving a network formed from network servers. In one such optional embodiment, the award server issues the award by transmitting data to, and receiving data from, the network server within the network.

DESCRIPTION

Figure 1:
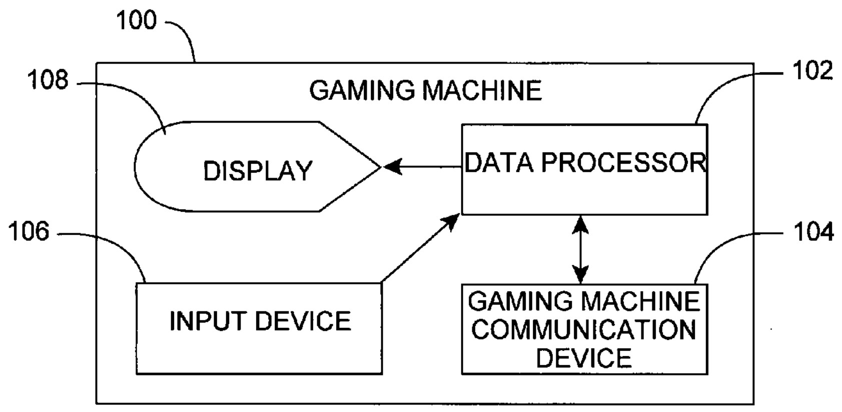
FIG. 1 is a block diagram of a gaming machine according to an embodiment of the present invention.
Figure 2:
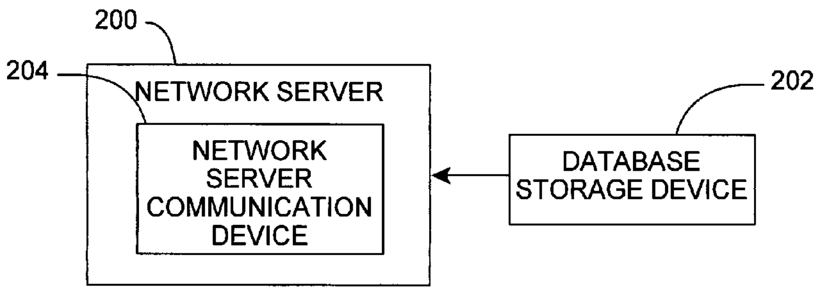
FIG. 2 is a block diagram of a network server according to an embodiment of the present invention.

Reference is now made to the figures wherein like parts are referred to by like numerals throughout. Referring generally to FIGS. 1-9, the present invention is directed to a system and method for conducting gaming. The invention includes one or more gaming machines 100. The gaming machine 100 may take any form. The gaming machine 100 includes a data processor 102 and a gaming machine communication device 104 communicating with, and under the control of, the data processor 102. The data processor 102 operates a random number generator; the random number generator may be hardware, software, an embedded device, a combination thereof, or the like. The gaming machine communication device 104 could take any form, such as a modem, router, hub, network interface card ("NIC") or other device adapted to transmit and receive data. In an optional embodiment, the gaming machine additionally includes an input device 106 communicating with the data processor. The gaming machine may include a display 108, or may communicate with a display.

The gaming machine 100 communicates with an award server 300. In an optional embodiment, the gaming machine 100 may communicate directly to an award server 300 such as through a direct connection. In another optional embodiment, the gaming machine 100 communicates to an award server 300 through a network, such as an intranet, a local area network, a wide area network, a world wide web on the Internet, or other computer network.

For example, referring to FIGS. 2-5, the gaming machine 100 communicates with an award server 300 through a network server 200. More specifically, a gaming machine 100 communicates via a gaming machine communication device 104 to a network server 200 having a network server communication device 204 which, in turn, communicates with an award server 300. As noted above, the network server communication device 204 could take any form, including a modem, NIC, hub, router, or the like. Optionally, the network server 200 includes a network processor (not shown).

Figure 3:
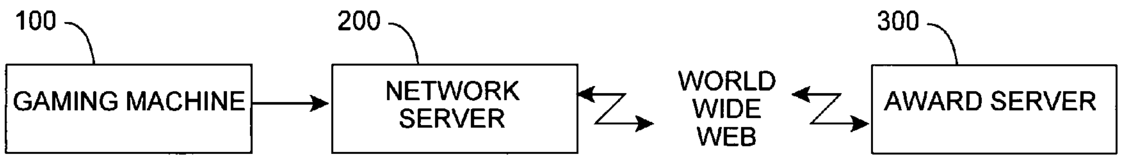
FIG. 3 is a block diagram of a system according to an embodiment of the present invention.
Figure 4:
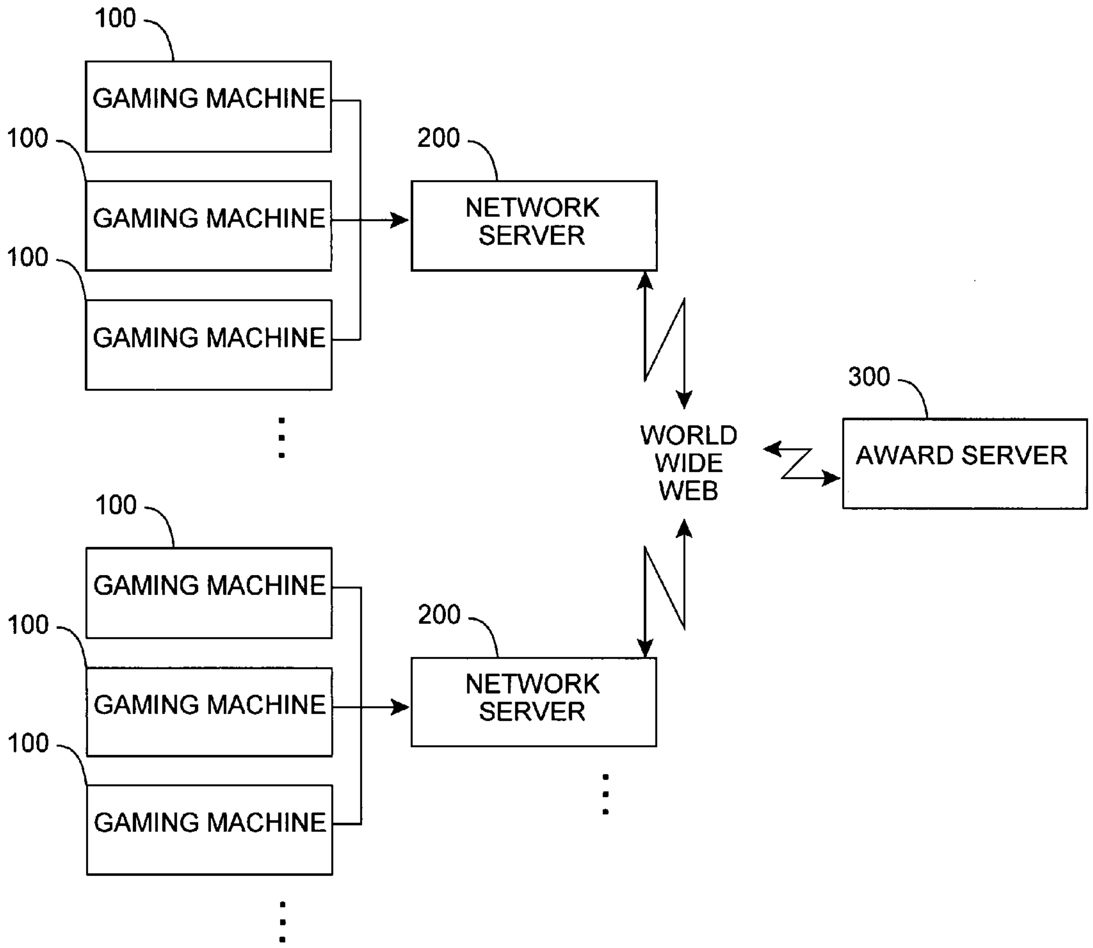
FIG. 4 is a block diagram of a system according to an embodiment of the present invention.

In one optional embodiment, shown in FIGS. 3 and 4, the network server 200 acts as an Internet gateway to a world wide web of web servers on the Internet. In such an optional embodiment, the network server 200 may be local, or may be remote such as at an Internet service provider ("ISP"). In another optional embodiment, shown in FIG. 5, the network server 200 may act locally to coordinate communication between a network of gaming machines 100 and an award server 300. For example, the award server 300 may be a server in an intranet or virtual private network ("VPN") serving a network formed by a plurality of network servers 200.

Returning to FIG. 2, the network server 200 may optionally communicate with a database storage device 202 that stores player records. For example, in an optional embodiment, the player records may be player tracking records (also referred to as player accounts, player rewards accounts, player loyalty accounts, or the like). In one such optional embodiment, the player records may be accessible to the network server 200. In a further optional embodiment, the network server 200 may be permitted to read from, write to, or read from and write to the player records.

Figure 5:
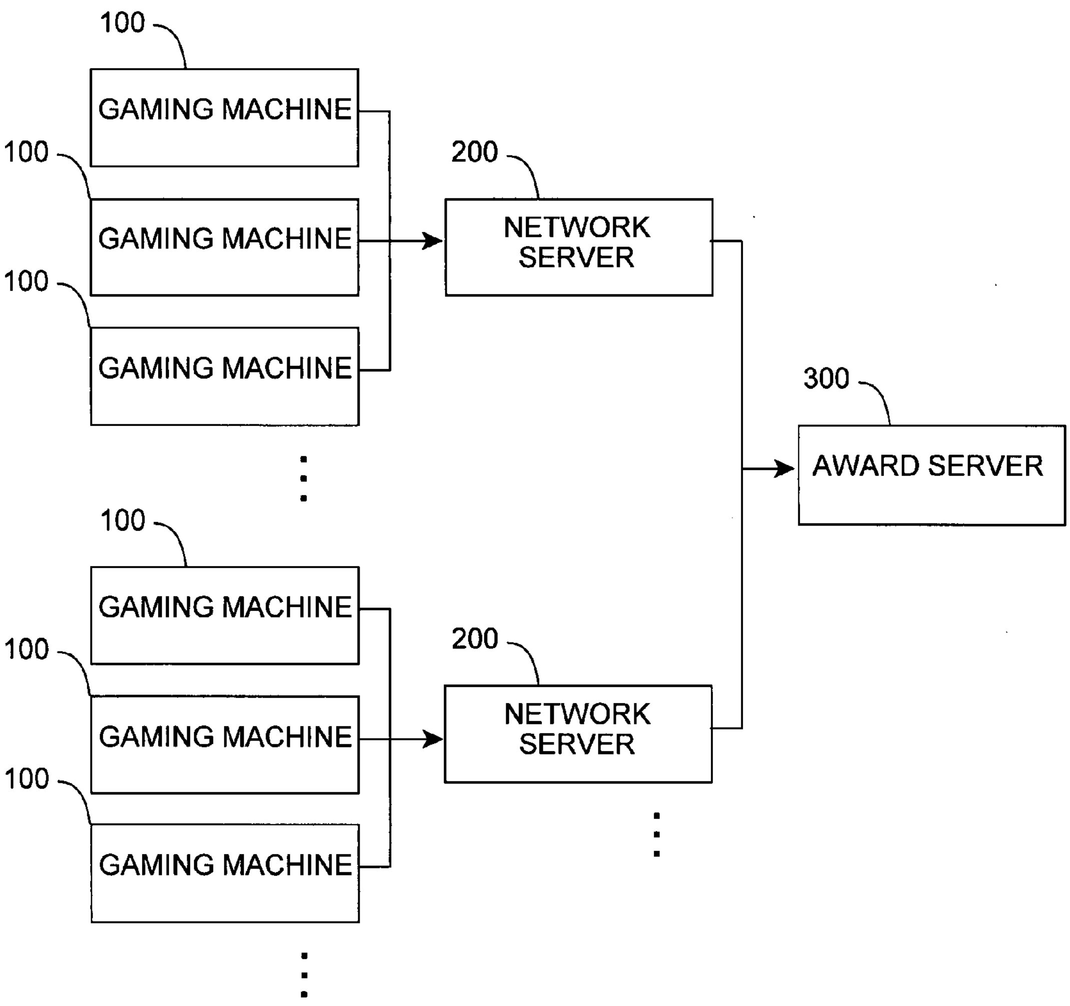
FIG. 5 is a block diagram of a system according to an embodiment of the present invention.

Referring generally to FIGS. 3-5, the award server 300 may take any form. For example, in an optional embodiment, the award server 300 is a web server accessible through a world wide web of web servers on the Internet. Optionally, the award server 300 is a secure web server that is accessible through a predefined security protocol. Alternatively, the award server 300 is an unsecured web server that is openly accessible. In any case, the award server 300 communicates with the gaming machine 100 by transmitting data to, and receiving data from, the gaming machine 100. As described above, the transmission and reception of data at the award server 300 may be conducted directly with the gaming machine 100 or via a network server 200.

Optional embodiments of methods for operating a system are illustrated in FIGS. 6-9. A gaming machine is provided 600, and an award server in communication with the gaming machine is provided 602. As previously discussed, the award server may communicate with the gaming machine directly or via a network server. A game of chance is conducted 604 at a gaming machine for a player. The game is conducted according to a predefined set of game rules. Optionally, the game is of a type in which the outcome of the game is dependent, at least in part, on a random number generated by the random number generator. For example, in a gaming machine conducting a card game, the cards dealt may depend, at least in part, on the output of a random number generator. Similarly, in a gaming machine conducting a reel slot game, the reel symbols displayed may depend, at least in part, on the output of a random number generator.

In any case, an outcome of the game is produced. It is noted that by "outcome," the present invention contemplates any outcome that may be produced in a game. For example, "outcome" may include any occurrence in a game, including a random occurrence, a primary game outcome, or a secondary game outcome that is produced as a result of, contingent upon, or temporally after a primary game outcome is produced. Secondary game outcomes may be produced through such procedures as bonuses for particular outcomes, secondary games, mystery bonuses, random triggers, or any other occurrence apart from the primary game.

Figure 6:
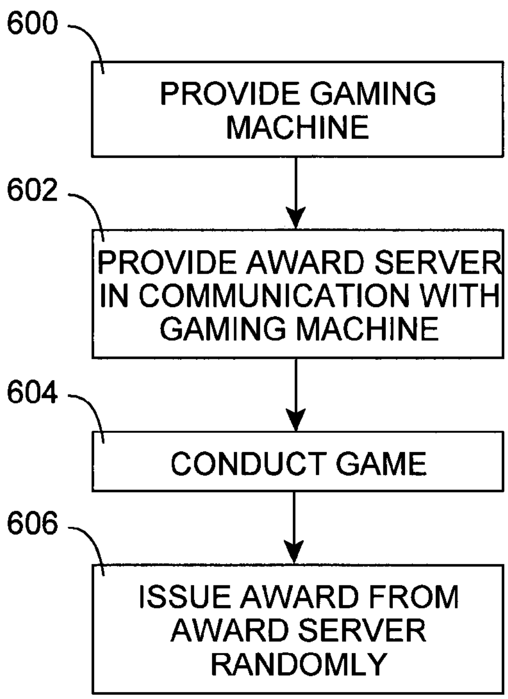
FIG. 6 is a flow chart of a method according to an optional embodiment of the present invention.
Figure 7:
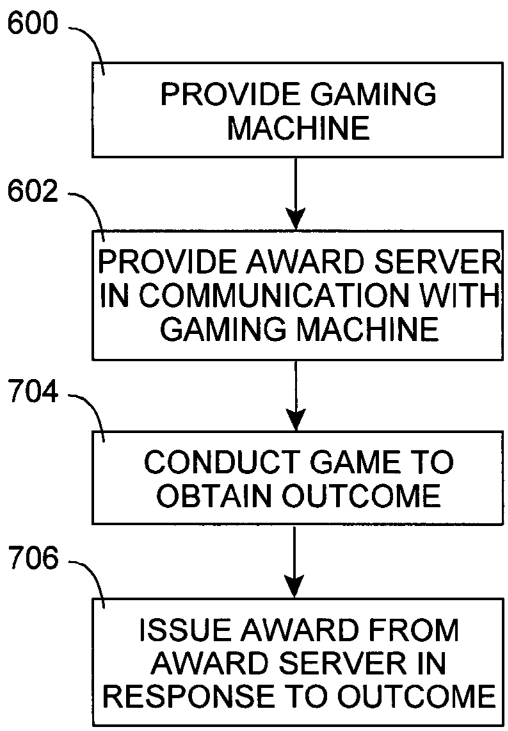
FIG. 7 is a flow chart of a method according to an optional embodiment of the present invention.

In one optional embodiment, shown in FIG. 6, the determination 606 of whether to issue an award from the award server is a random event, i.e. the issuance of an award from the award server is not tied to the outcome of the game. In another optional embodiment, shown in FIG. 7, at least one of the outcomes is associated with an award issued by the award server. The game is conducted to produce 704 an outcome and if the outcome obtained is associated with an award from the award server, the data processor issues 706 the award. It should be noted that in an optional embodiment in which the issuance of an award from the award server depends on an outcome of the game, other outcomes may take many forms, including losing outcomes and winning outcomes that are tied to an award, but not an award from the award server. For example, a certain outcome, such as 7 7 7 reel symbols appearing on a reel slot machine pay line may be associated with an award from the award server, with the remaining outcomes allocated between losing outcomes, such as mixed reel symbols on a pay line, associated with no award and winning outcomes, such as BAR BAR BAR reel symbols on a pay line, associated with a pay out rather than an award from the award server. In another optional embodiment, all outcomes resulting in an award are associated with an award from the award server. In yet another optional embodiment, outcomes may be associated with both an award from the award server and a pay out at the gaming machine. It is noted that in optional embodiments including pay outs, the pay outs could take any form, including machine credits, coin, cash, voucher, or any other form of pay out.

Optionally, the issuance of an award from the award server may occur at a time proximate to the player obtaining the outcome associated with the award, or the issuance of the award may be delayed. Similarly, issuance of an award from the award server may occur after the satisfaction of some threshold criterion, such as the accrual of a predetermined quantity of outcomes associated with the issuance of an award from the award server or a the accrual of a predetermined value of outcomes associated with the issuance of an award from the award server. For example, a player may be issued an award from an award server upon obtaining outcomes associated with an award issued by the award server in, for example, at least three games, or a player may be issued an award from an award server upon obtaining outcomes associated with an award from the award server totaling, for example, at least $20.00.

Figure 8:
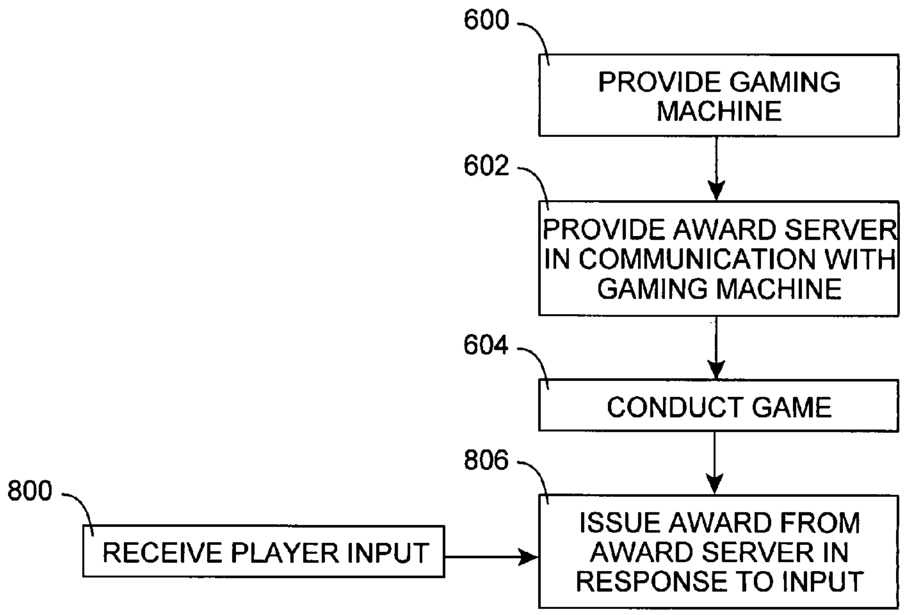
FIG. 8 is a flow chart of a method according to an optional embodiment of the present invention.

In another optional embodiment, shown in FIG. 8, the award server may receive 800 player input via the gaming machine and the issuance 806 of an award from the award server may occur at least partially in response to the input by the player. For example, in an optional embodiment, the issuance of an award from the award server may be selectable by a player. In an example of such an optional embodiment, the player may be given a choice of "cashing out" or being issued an award from the award server. If the player inputs a selection to be issued an award from the award server, the award server issues the award. In a further optional embodiment, the input received may additionally include a selection of the award or awards to be issued by the award server. For example, a player may input a selection to be issued an award from the award server, and additionally input a selection of award A (as distinguished from awards B or C).

In another optional embodiment, outcomes associated with awards from the award server may be "banked" in a player record stored at the database storage device. For example, a player obtaining three outcomes associated with an award from an award server may be allowed to store those outcomes in a player record for access at a later time. Similarly, a player obtaining $20.00 in value in outcomes for an award from an award server may be allowed to store that value in a player record for access at a later time. In an optional embodiment, the player may accrue additional outcomes (either in quantity or in value) over time so that the player with, for example, $20.00 in value toward an award from an award server may be allowed to add to that value at a later time by obtaining additional outcomes associated with awards from the award server.

As noted above, the player record may be maintained strictly for awards from the award server, or may be associated with other data, such as player rewards or player tracking data. In an alternate optional embodiment, the outcomes may be stored and tracked using a real or virtual voucher that can be redeemed at a later time. For example, a player may be issued a code in a physical form (such as a receipt or voucher) or in electronic form (such as in an e-mail) that may permit the player to later request issuance of an award through the award server or, in an optional embodiment, accrual of additional outcomes to the balance associated with the code.

Figure 9:
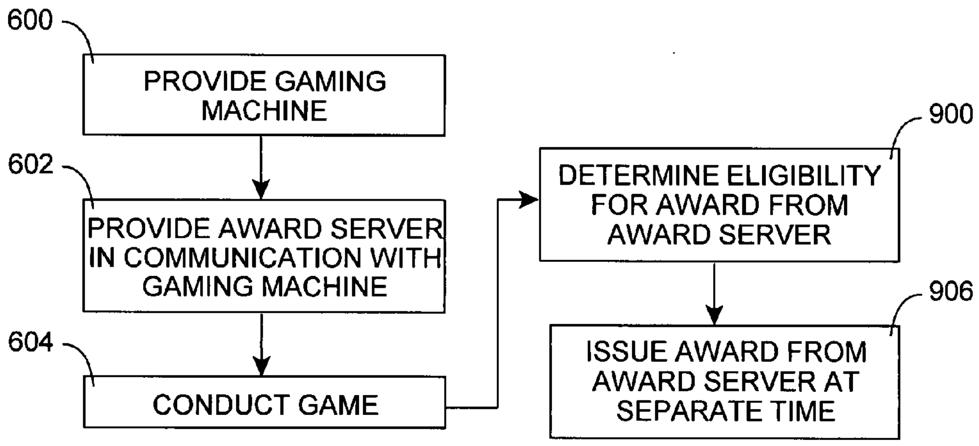
FIG. 9 is a flow chart of a method according to an optional embodiment of the present invention.

It should be noted that while a the award is issued by the award server as a result of communication from the gaming machine, the player may be permitted to select and prompt issuance of the award apart from the gaming machine, e.g. from a home computer, kiosk, redemption center, or the like. In such an optional embodiment, the step of determining 900 the player to be eligible for an award from the award server through conduct of the game at the gaming machine is separated from the issuance 906 of the award from the award server, which could occur at a separate time and as a result of a communication to the award server from something other than the gaming machine, as shown in FIG. 9.

In a variation on such an optional embodiment, the outcomes associated with an award through the award server may be stored and tracked through a third-party system accessible to the player through the Internet. For example, a third party financial services system may track the quantity or value of outcomes associated with an award from the award server.

Referring generally to FIGS. 6-9, the awards and the issuance of the awards from the award server may take any form. For example, the award may be a good or service. In one such optional embodiment, the player exchanges the outcome for the good or service. In one such optional embodiment, the award server may receive data that at least represents the outcome obtained. Thus, in an example of such an optional embodiment in which the prizes awarded relate to travel, a player with a first outcome may be awarded a discount for an airplane ticket by the award server, a player with a second outcome may be awarded a free airplane ticket to a domestic destination by the award server, and a player with a third outcome may be awarded a free airplane ticket to an international destination by the award server. Optionally, the distinction among the various outcomes would be the expected value of the outcome, e.g. the statistical frequency of the outcome compared to its value, so that, in such an example, the third outcome would occur less frequently than the second outcome, and the second outcome would occur less frequently than the first outcome.

As noted above, the award server may receive data representing input by the player selecting a good or service to exchange for the outcome associated with the award. Thus, in one optional embodiment in which the awards may be segregated by the award server, the award server may determine which awards are available to the player for selection based on the quantity or value of the outcome, and the player may be allowed to select from the available group of awards. Thus, in one example, a player with a first outcome may be limited to selecting from a selection of books, a player with a second outcome may be limited to selecting from a selection of books and CDs, while a player with a third outcome may be allowed to select an award from a selection of books, CDs, and DVDs.

In another optional embodiment, the divisions among awards may be based on the monetary value of the awards. For example, in one such optional embodiment, a player with a first outcome may be limited to selecting from a selection of goods having an award value of up to $20.00, a player with a second outcome may be limited to selecting from a selection of goods having an award value of up to $50.00, and so forth.

In a variation on such an optional embodiment, a player may be allowed to select from a selection of goods each associated with an award value so long as the value of the selected awards is less than the award amount. In an example of such an optional embodiment, a player obtaining a certain outcome may be issued an award of $100.00 in goods by the award server, thereby permitting the player to select up to $100.00 worth of goods.

In yet another variation on such an optional embodiment, a player may be allowed to select a certain quantity of goods from a selection of goods based on the award issued. For example, a player obtaining a first outcome may be permitted to select three CDs, a player obtaining a second outcome may be permitted to select five CDs, and so forth.

In another optional embodiment, the award server receives wager data and outcome data and uses the data to segregate the awards. For example, in one optional embodiment, a player wagering a certain wager amount who obtains an outcome rewarded by the award server may be rewarded with a less valuable award than a player who obtains the same outcome, but wagers a different wager amount. In one optional embodiment, the award varies proportionally with wager amount so that players wagering greater amounts are rewarded with awards having a proportionally greater value. It is noted that wagering data may merely include total wager, or may include such wager parameters as the number of pay lines or hands played, the wager on each pay line or hand, the denomination of the coins, or other wager information, so that such wager parameters may be taken into account in determining which award to issue to a player.

In yet another optional embodiment, the award server receives player data and outcome data and uses the player data to preferentially offer certain awards. In various optional embodiments, the player data received at the award server may be input by the player at the gaming machine or extracted from player records (as described above). For example, in one optional embodiment, the award server may receive player data regarding the player's residence and reward, or offer to reward, the player with awards specific to the player's geographic residence, e.g. events near the player's residence, goods or services obtained from vendors near the player's residence, and the like. In an other example, the award server may receive player data regarding the player (such as shopping preferences, gender, age, or the like), and reward, or offer to reward, the player with awards relating to the player data. In any such optional embodiment, the awards may also be segregated by value, so any player data would be combined with wager data and/or outcome data to define a set of one or more awards issued or offered to the player that, optionally, vary with, for example, total wager, pay lines or hands played, wager per pay line or hand, coin denomination, or the like.

In an optional embodiment, the award has some monetary value that can be transferred electronically by the award server. For example, in an optional embodiment, the player exchanges the outcome for a monetary award from the award server. In one such optional embodiment, the award may include the transfer of a monetary award from the award server to a bank account, credit card account, or credit account, to a stored value card (such as a gift card), to an account maintained for the player by the operator of the game (such as the casino or hotel), to a vendor in exchange for goods or services, or the like. In an optional embodiment, the award server may receive data representing input by the player directing how the monetary award is to be transferred (including, in an optional embodiment, where or to whom the transfer occurs). For example, in one such optional embodiment, the input may include an account number, personal identification number ("PIN"), or similar information allowing the player to effect a transfer of the award from the award server directly to the account identified.

Turning, then, to a more concrete example, in an optional embodiment, a player may place a wager to play a game at the gaming machine. The wager may be made in any manner, including allocating the wager from game credits stored at the gaming machine or depositing the wager through a wager handling device in the form of currency, voucher, printed ticket, stored value card, or the like.

The game is conducted for the player according to a predefined set of game rules. The game may take any form, including a card game, a reel slot game, a tile game, dice game, a roulette game, or any other game in which the outcome is determined, at least in part, by a randomly determined event at the data processor in the gaming machine. The game produces an outcome. For example, an outcome could be a hand of cards, arrangements of slot reel symbols on defined pay lines, or the like, depending on the game. Similarly, the outcome could be a secondary game outcome such as a bonus screen, secondary game, wheel game, or other type of bonus game or bonus selection process.

A determination is made whether to issue an award from the award server. In one optional embodiment, the determination is made independent of the outcome. That is, in such an optional embodiment, the determination is made randomly in a way that is separate from the outcome. In such an optional embodiment, the player becomes eligible to have an award issued from the award server in a random fashion.

In another optional embodiment, the determination is made in response to an outcome obtained in the game. Thus, in such an optional embodiment, a player obtaining a particular outcome, such as a particular hand of cards, or a particular arrangement of slot reel symbols, or the like, may be eligible to receive an award from the award server.

In an optional embodiment, the gaming machine communicates through the network server to the award server that an award is to be issued from the award server. Again, as discussed above, this may occur automatically or upon input from the player. Similarly, as discussed above, this may occur immediately or may be delayed or may occur on demand from the player. As noted above, the actual transmission of the communications between the gaming machine and the award server via the network server may be conducted via the world wide web on the Internet, through an intranet, or other computer network.

In an optional embodiment, the gaming machine includes a display that is generated in response to data received from the award server directly or via a network server. For example, the display may display the award issued by the award server. In an optional embodiment in which the award is issued in response to input received from the player via an input device, the display may include award options, delivery options, or the like. The player may input the player's selection through the input device. The input is received at the award server and the award is issued in conformity with the input.

For example, in one such optional embodiment, a player may be presented with a display listing award options, such as books, CDs, DVDs, or like awards offered by the award server, as well as delivery options, such as delivery to the hotel, delivery to the player's home, or like delivery options. The player inputs his or her selections at the gaming machine, for example, a book on casino gambling delivered to the player's house, and the selections are received at the award server so that the award can be issued accordingly.

In another example of such an optional embodiment, a player may be presented with a display informing the player of an award having a monetary value and options for receiving the monetary value, such as deposit to a bank account, payment to a credit line or credit account, credit to the player's hotel bill, deposit to a stored value card, cash-out, or the like. If the player inputs certain selections, such as a transfer to a bank account, credit line or credit account, or hotel bill, the player may be prompted for additional input such as the player's bank account number and bank routing number, credit account number, hotel room number, or the like. The input is received at the award server and the award is issued.

In another optional embodiment, awards may be segregated. The award server determines which award or awards for which the player may be eligible. In one optional embodiment, the determination is random; in another optional embodiment, the award server receives data, such as player data, outcome data, wager data, or other data, and determines which award or awards are available to the player based, at least in part, on the data received. For example, such factors affecting the eligibility for certain prizes may include the outcome obtained by the player, the wager by the player, the wager history of the player, personal information about the player (e.g. age, gender, geographic residence, or the like), or other information. It is noted that the data may be received from the gaming machine or through input at the gaming machine or from some other source, such as player records stored at a database. The award or awards available to the player may be issued, or the player may be allowed to enter a selection of the award.

As previously discussed, the issuance of certain awards may include the receipt of input from a player at the gaming machine that is transmitted to the award server. For example, in an optional embodiment, the award may include the transfer of an award from the award server to an account (such as bank account, credit card account, credit account, deposition account, stored value card, or the like) at a third party financial server. In one such optional embodiment, a method may include receiving account data as input at the gaming machine, and transmitting the account data to the award server to effect the transfer of the award from the award server to the third party financial server. For example, a player may be prompted to enter an account number, PIN, or other identifying data used at the award server to transfer the award to the designated account. In an optional embodiment, the transfer may be effected through an electronic funds transfer, credit transaction, or similar electronic transaction.

While certain embodiments of the present invention have been shown and described it is to be understood that the present invention is subject to many modifications and changes without departing from the spirit and scope of the invention presented herein.

We claim:

1. A gaming system comprising:
at least one gaming machine adapted to conduct a game of chance according to a predefined set of game rules for at least one player in response to a wager comprising:
a data processor adapted to receive wager data in response to said wager, said data processor including a random number generator, said random number generator adapted to generate a random number used, at least in part, to generate an outcome for said game, said data processor adapted to determine the issuance of at least one award;
an input device in communication with said data processor adapted to receive at least one of player input and player data and transmit said at least one of player input and player data to said data processor; and
a gaming machine communication device in communication with said data processor; and
an award server in communication with said gaming machine through said gaming machine communication device, said award server programmed to conduct a method comprising:
receiving at least one of (a) player input and (b) player data from said data processor of said gaming machine;
selecting a set of one or more awards based on at least one of said player input and said player data; and
transmitting said set of one or more awards to said gaming machine for awarding in response to said determination by said data processor to issue said set of one or more awards.

2. The gaming system of claim 1, wherein said data processor is adapted to determine the issuance of an award randomly.

3. The gaming system of claim 1, wherein said data processor is adapted to determine the issuance of an award based on at least one of said outcomes.

4. The gaming system of claim 1 wherein said award server is an Internet web server in communication with a world wide web of web servers.

5. The gaming system of claim 1 wherein said player input includes a player selection of a set of one or more awards.

6. The gaming system of claim 1 wherein said player record includes player data collected from said player including at least one of said player's geographic residence, said player's shopping preferences, said player's gender, and said player's age.

7. The gaming system of claim 1 wherein said game includes multiple pay lines which may be selectively wagered upon, and said wager data includes at least one of the number of pay lines wagered upon and the wager on each pay line.

8. The gaming system of claim 1 wherein said game includes multiple hands which may be selectively wagered upon, and said wager data includes at least one of the number of hands wagered upon and the wager on each hand.

9. A gaming system comprising:

at least one gaming machine adapted to conduct a game of chance according to a predefined set of game rules for at least one player in response to a wager comprising:

a data processor adapted to receive wager data in response to said wager, said data processor including a random number generator, said random number generator adapted to generate a random number used, at least in part, to generate an outcome for said game, said data processor adapted to trigger the issuance of at least one award;

an input device in communication with said data processor adapted to receive player input and transmit said player input to said data processor; and a gaming machine communication device in communication with said data processor;

a network server having a network server communication device adapted to communicate with said gaming machine through said gaming machine communication device, said network server in communication with a database storage device adapted to store player data in player records accessible to said network server; and an award server in communication with said gaming machine and network server, said award server programmed to conduct a method comprising:

receiving at least one of (a) player input from said data processor of said gaming machine and (b) player data from said network server;

selecting a set of one or more awards based on at least one of said player input and said player data; and transmitting said set of one or more awards to said gaming machine for awarding in response to said triggering by said data processor to issue said set of one or more awards.

10. The gaming system of claim 9 wherein said award server is an intranet server serving a network formed from at least one of said network servers.

11. The gaming system of claim 9 wherein said award server is an Internet web server in communication with a world wide web of web servers.

12. The gaming system of claim 9, wherein said data processor is adapted to determine the issuance of a set of one or more awards randomly.

13. The gaming system of claim 9, wherein said data processor is adapted to determine the issuance of a set of one or more awards based on at least one of said outcomes.

14. The gaming system of claim 9 wherein said player input includes a player selection of a set of one or more awards.

15. The gaming system of claim 9 wherein said player record includes player data collected from said player including at least one of said player's geographic residence, said player's shopping preferences, said player's gender, and said player's age.

16. The gaming system of claim 9 wherein said game includes multiple pay lines which may be selectively wagered upon, and said wager data includes at least one of the number of pay lines wagered upon and the wager on each pay line.

17. The gaming system of claim 9 wherein said game includes multiple hands which may be selectively wagered upon, and said wager data includes at least one of the number of hands wagered upon and the wager on each hand.

18. A gaming system comprising:

at least one gaming machine adapted to conduct a game of chance according to a predefined set of game rules for at least one player in response to a wager comprising:

a data processor adapted to receive wager data in response to said wager, said data processor including a random number generator, said random number generator adapted to generate a random number used, at least in part, to generate an outcome for said game, said data processor adapted to determine the issuance of at least one award;

an input device in communication with said data processor adapted to receive player input and transmit said player input to said data processor; and a gaming machine communication device in communication with said data processor;

a network server having a network server communication device adapted to communicate with said gaming machine through said gaming machine communication device, said network server in communication with a database storage device adapted to store player data in player records accessible to said network server; and an award server in communication with said gaming machine and network server, said award server programmed to conduct a method comprising:

receiving at least one of said outcome and said wager data from said data processor of said gaming machine and at least one of (a) player input from said data processor of said gaming machine and (b) player data from said network server;

selecting a set of one or more awards based on at least one of said player input and said player data in combination with at least one of said outcome and said wager data; and transmitting said set of one or more awards to said gaming machine for awarding in response to said triggering by said data processor to issue said set of one or more awards.

19. The gaming system of claim 18 wherein said award server is an intranet server serving a network formed from said network servers.

20. The gaming system of claim 18 wherein said award server is an Internet web server in communication with a world wide web of web servers.

21. The gaming system of claim 18, wherein said data processor is adapted to determine the issuance of a set of one or more awards randomly.

22. The gaming system of claim 18, wherein said data processor is adapted to determine the issuance of a set of one or more awards based on at least one of said outcomes.

23. The gaming system of claim 18 wherein said player input includes a player selection of a set of one or more awards.

24. The gaming system of claim 18 wherein said player record includes player data collected from said player including at least one of said player's geographic residence, said player's shopping preferences, said player's gender, and said player's age.

25. The gaming system of claim 18 wherein said game includes multiple pay lines which may be selectively wagered upon, and said wager data includes at least one of the number of pay lines wagered upon and the wager on each pay line.

26. The gaming system of claim 18 wherein said game includes multiple hands which may be selectively wagered upon, and said wager data includes at least one of the number of hands wagered upon and the wager on each hand.

27. The gaming system of claim 18 wherein said set of one or more awards includes a plurality of awards and said player input includes a selection input by said player through said input device of a plurality of awards, such that said award server selects, and said gaming machine determines the issuance of, a plurality of awards to said player.

28. A method for operating a gaming system adapted to transmit data to, and receive data from, a remote award server, comprising:

providing at least one gaming machine conducting a game of chance comprising:

a data processor including a random number generator;

an input device in communication with said data processor adapted to receive player input and transmit said player input to said data processor;

a gaming machine communication device in communication with said data processor;

providing an award server adapted to communicate with said gaming machine;

providing a network server having a network server communication device adapted to communicate with said gaming machine through said gaming machine communication device and with said award server such that said award server communicates with said gaming machine via said network server;

storing player records at a database storage device in communication with said network server;

conducting said game according to a predefined set of game rules for at least one player in response to a wager to obtain an outcome, said outcome determined, at least in part, by a random number generated by said random number generator;

receiving player input through said input device at said gaming machine and transmitting said player input to said award server;

accessing said player data stored in player records stored at said database storage device by said network server and transmitting said player data to said award server;

receiving by said award server of said outcome and said wager data from said data processor of said gaming machine and at least one of (a) player input from said data processor of said gaming machine and (b) player data from said network server;

selecting by said award server of a set of one or more awards based on at least one of said player input and said player data in combination with at least one of said outcome and said wager data; and transmitting said set of one or more awards by said award server to said gaming machine for awarding in response to said triggering by said data processor to issue said set of one or more awards.

29. The method of claim 28 wherein said award server is an intranet server serving a network formed from at least one of said network servers such that said step of issuing said award includes said award server transmitting data to, and receiving data from, said network server within said network.

30. The method of claim 28 wherein said step of issuing said award is conducted randomly.

31. The method of claim 28 wherein said step of issuing said award is conducted in response to at least one of said outcomes.

32. The method of claim 28 wherein said game includes multiple pay lines which can be selectively wagered upon, and said wager data includes at least one wager parameter selected from the group consisting of the number of pay lines wagered upon and the wager on each pay line.

33. The method of claim 32 wherein said awards are associated with an award value, said step of issuing said award includes selecting an award with increasing award value as said wager parameter increases.

34. The method of claim 32 wherein said step of issuing said award includes issuing a greater quantity of awards as said wager parameter increases.

35. The method of claim 28 wherein said game includes multiple hands which can be selectively wagered upon, and said wager data includes at least one wager parameter selected from the group consisting of the number of hands wagered upon and the wager on each hand.

36. The method of claim 35 wherein said awards are associated with an award value, said step of issuing said award includes selecting an award with increasing award value as said wager parameter increases.

37. The method of claim 35 wherein said step of issuing said award includes issuing a greater quantity of awards as said wager parameter increases.

38. The method of claim 28 wherein said award server is an Internet web server in communication with a world wide web of web servers such that said step of issuing said award includes said award server transmitting packets of data to, and receiving packets of data from, said gaming machine via said world wide web.

39. The method of claim 38 wherein said award server is in communication with a third party financial server via said world wide web of web servers such that said step of issuing said award includes transferring a monetary value associated with said award to said third party financial server.

* * * * *